DISCRIMINATOR WITH LINEAR CHARACTERISTIC CURVE UTILIZING A BRIDGE CIRCUIT HAVING A BRANCH CONTAINING AN INDUCTIVE REACTOR AND A BRANCH CONTAINING A CAPACITIVE REACTOR

Filed Aug. 18, 1965

INVENTOR
Josef Gammel

BY Spiel & Spiel
ATTYS.

INVENTOR
Josef Gammel
BY Spee & Spee
ATTYS.

3,421,094
Patented Jan. 7, 1969

3,421,094

DISCRIMINATOR WITH LINEAR CHARACTERISTIC CURVE UTILIZING A BRIDGE CIRCUIT HAVING A BRANCH CONTAINING AN INDUCTIVE REACTOR AND A BRANCH CONTAINING A CAPACITIVE REACTOR

Josef Gammel, Munich, Germany, assignor to Siemens Aktiengesellschaft, a corporation of Germany Filed Aug. 18, 1965, Ser. No. 482,324
Claims priority, application Germany, Aug. 20, 1964, S 92,737
U.S. Cl. 329—137 5 Claims
Int. Cl. H03d 3/02

ABSTRACT OF THE DISCLOSURE

A discriminator circuit having the input voltage thereof fed over high-ohmic resistances into an inductive reactor and a capacitive reactor, wherein the voltages appearing at the inductive reactor and at the capacitive reactor are rectified and combined into a differential voltage.

Figure 1:
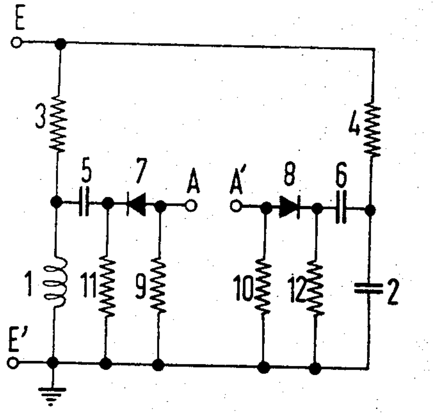

The invention relates to a discriminator for obtaining an output voltage dependent on a frequency alteration of an electrical oscillation, especially for the demodulation of frequency-modulated electric waves.

The basic problem of the invention is to produce a discriminator circuit which, as compared to the known circuits, has a more linear characteristic curve.

This problem is solved in a discriminator for obtaining an output voltage dependent on a frequency alteration of an electric oscillation, especially for the demodulation of frequency-modulated electric oscillations, according to the invention, by an arrangement in which as the input for the oscillations there are provided two parallel-connected branches of a bridge circuit, one of which contains the series circuit of a high ohmic resistor and an inductive reactor, in which the inductive and capacitive reactance at the central frequency are preferably chosen equal in value, and that two rectifiers are provided, of which one rectifies the voltage drop at the inductive reactor and the other the voltage drop at the capacitive reactor, in which system the sum of oppositely poled DC voltages comprise the output voltage.

In an advantageous embodiment of the invention the two-high-ohmic resistors are replaced by a parallel resonant circuit tuned to the central frequency, in such a way that the inductive reactor is connected to one of the two terminals of the parallel resonant circuit and the capacitive reactor is connected to the other of the two terminals of the parallel resonant circuit with the signal being applied between the connecting point of the two reactors and a tap preferably situated in the electrical center of the parallel resonant circuit. The tap disposed in the electrical center of the parallel resonant circuit may be either a center tap of the oscillatory circuit coil or the connecting point of two capacitors of equal capacitance, whose series circuit forms the oscillatory circuit capacitance.

In this case, besides the input voltage, there also appears on the reactor the voltage occurring in the oscillatory circuit, which advantageously produces a steepening of the discriminator curve because there now occurs, in dependence on the frequency, an additional phase rotation between the voltage on the input of the discriminator and the voltage occurring on the oscillatory circuit.

Further advantageous development of the invention comprises an arrangement in which there is provided, parallel to the bridge input, another parallel resonant circuit tuned to the central frequency, which parallel resonant circuit is coupled with the first resonant circuit over the reactances to form a band filter. Here is utilized the property of band filters that at the resonant frequency the output voltage is phase-shifted by 90° against the input voltage. At the central frequency, therefore, the voltages occurring on the output-side oscillatory circuit (parallel resonant circuit), with reference to the inductance on the middle tap are displaced 180° in phase among one another, and by 90° in phase with respect to the input voltage. If the frequency deviates from the central frequency, the phase angle of 180° between the oscillatory circuit voltages then remains preserved. On the other hand, the phase angle between these oscillatory circuit voltages and the input voltage changes approximately proportionally to the frequency deviation with respect to the central frequency and there in like but amplified degree the magnitude of the output voltage from the difference of the voltage drops at the reactances, which here is formed in each case from the voltage sum of the input voltage and one of the two oscillatory circuit voltages.

With the aid of examples of various embodiments represented in the respective figures of the drawing the invention is explained in detail.

FIG. 1 illustrates a discriminator in which the frequency-modulated signal lies on the input terminal E, E′. Extending between the input terminals E, E′ and two parallel-connected branches of a bridge circuit, one of which contains a series circuit comprising an inductive reactor 1 and an ohmic resistor 3, which has a high resistance value as compared to the reactor, and the other of which contains a series circuit comprising a capacitive reactor 2 and an ohmic resistor 4, which has high resistance value as compared to the reactor. The inductive reactor 1 and the capacitive reactor 2 are, in the example equal in amount at the central frequency. The voltage drops over the inductive reactor 1 and the capacitive reactor 2 are fed, over the capacitors 5 and 6, to respective rectifier circuits which comprise rectifiers 7 and 8, load resistors 9 and 10, resistors 11 and 12. The resistors 11 and 12 optionally, may be replaced by chokes.

The manner of operation of the discriminator is as follows:

The signal voltage between the bridge terminals E, E′ extends over the bridge branches 1, 3 and 2, 4. With the provision of the high ohmic resistors 3, 4, as the current at the reactor 1 lags the signal voltage by 90° while at the capacitive reactor 2, it leads by 90°, the voltages over the two reactors 1, 2 are rotated with respect to one another by 180°. The alternating potential drop over the inductive reactor 1 is coupled by the capacitance 5 to the rectifier 7, having the load resistor 9 connected therewith. The direct current path of the rectifier current is completed over the load resistor 11, which may be replaced by a choke. The alternating potential drop over the capacitive reactor 2 is coupled by the capacitance 6 to the rectifier 8, having the resistor 10 connected thereto. The direct current path of the rectifier circuit is completed over the resistor 12, which may be replaced by a choke. The differential voltage of both direct voltages thus appears between the output terminals A, A′.

This differential voltage is zero, at the central frequency at which the inductive reactor 1 and the capacitive reactor 2 are equal in amount. If the frequency deviates in the direction of lower frequencies, then the voltage over the inductive reactor 1 becomes smaller and over the capacitive reactor 2 larger. If the frequency becomes greater than the central frequency, the voltages change in the opposite directions. There results, accordingly, a voltage course dependent on frequency, designated as discriminator characteristic curve, which assumes a value of zero at the central frequency.

Figure 2:
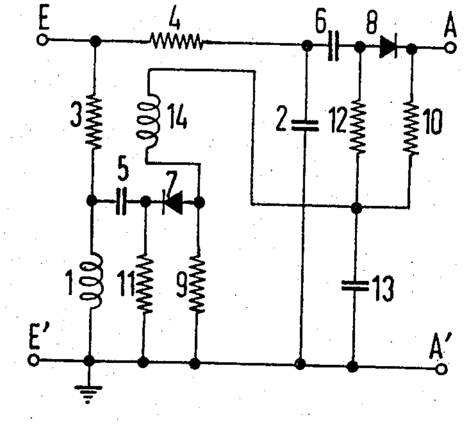

While the output voltage is obtained at the output terminals A, A′ symmetrically to ground in FIG. 1, the discriminator circuit in FIG. 2 is so designed that the output voltage at the output terminals A, A′ can be obtained asymmetrically to ground.

For this purpose the conductive connection between the resistors 10, 12 and ground is replaced by a capacitor 13. The voltage drop over the capacitive reactor 2 is now coupled over capacitors 6, 13 to the ground-free rectifier circuit 8, 10, 12. The direct potential drop at resistor 9 is applied over the choke 14 in opposition to the direct voltage drop across resistor 10. Accordingly, the differential voltage forming the discriminator characteristic curve appears at the output terminals A, A′.

Figure 3:
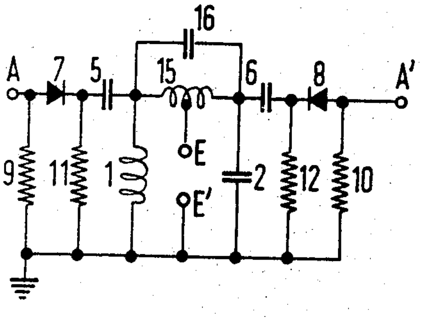

FIG. 3 illustrates a discriminator in which, in contrast to the example of FIG. 1, the ohmic resistors 3, 4 are replaced by a parallel resonat circuit comprising the coil 15, and the capacitor 16. The input terminal E lies on the central tap of the oscillatory circuit coil 15.

If the frequency-modulated signal is applied on the input terminals E, E′, the currents flowing through the inductive reactor 1 and the capacitive reactor 2 excite the parallel resonant circuit 15, 16, tuned to the central frequency, to resonance. The parallel resonant circuit 15, 16 here presents an effective resistance of high value and the circuit thus corresponds approximately to that represented in FIG. 1. If the frequency deviates downward, the reactor of the parallel resonant circuit thereon receives an inductive component, while if the frequency deviates upward, the reactor there receives a capacitive component. This property brings about, as previously set forth, a phase rotation of the voltage occurring on the parallel resonant circuit with respect to the input voltage exciting it, which, as a consequence, produces a steepening of the discriminator characteristic curve, which is desirable in many cases of application.

Figure 4:
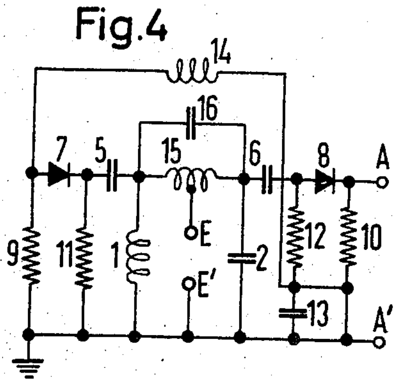

While the output voltage between the output terminals A, A′ of FIG. 3 extends symmetrically to ground, in the analogous circuit illustrated in FIG. 4 it can be derived asymmetrically to ground. For the achievement of an output voltage asymmetrical to ground the circuit can be modified by insertion of the capacitor 13 and the choke 14, corresponding to the circuit explained in FIG. 2.

Figure 5:
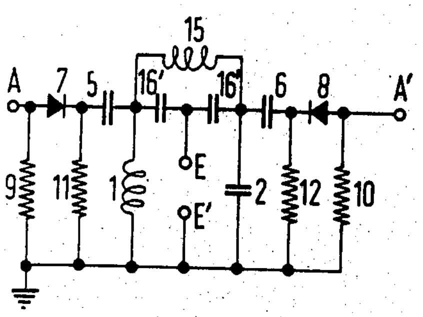
Figure 6:
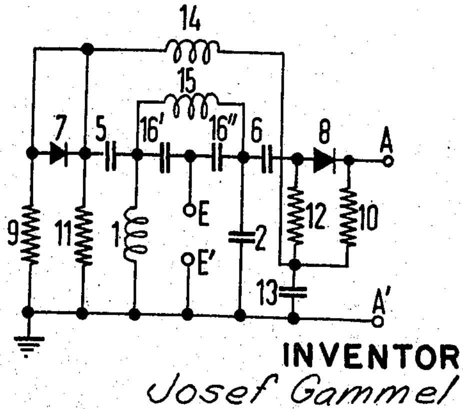
Figures 7, 8, 9, 10:
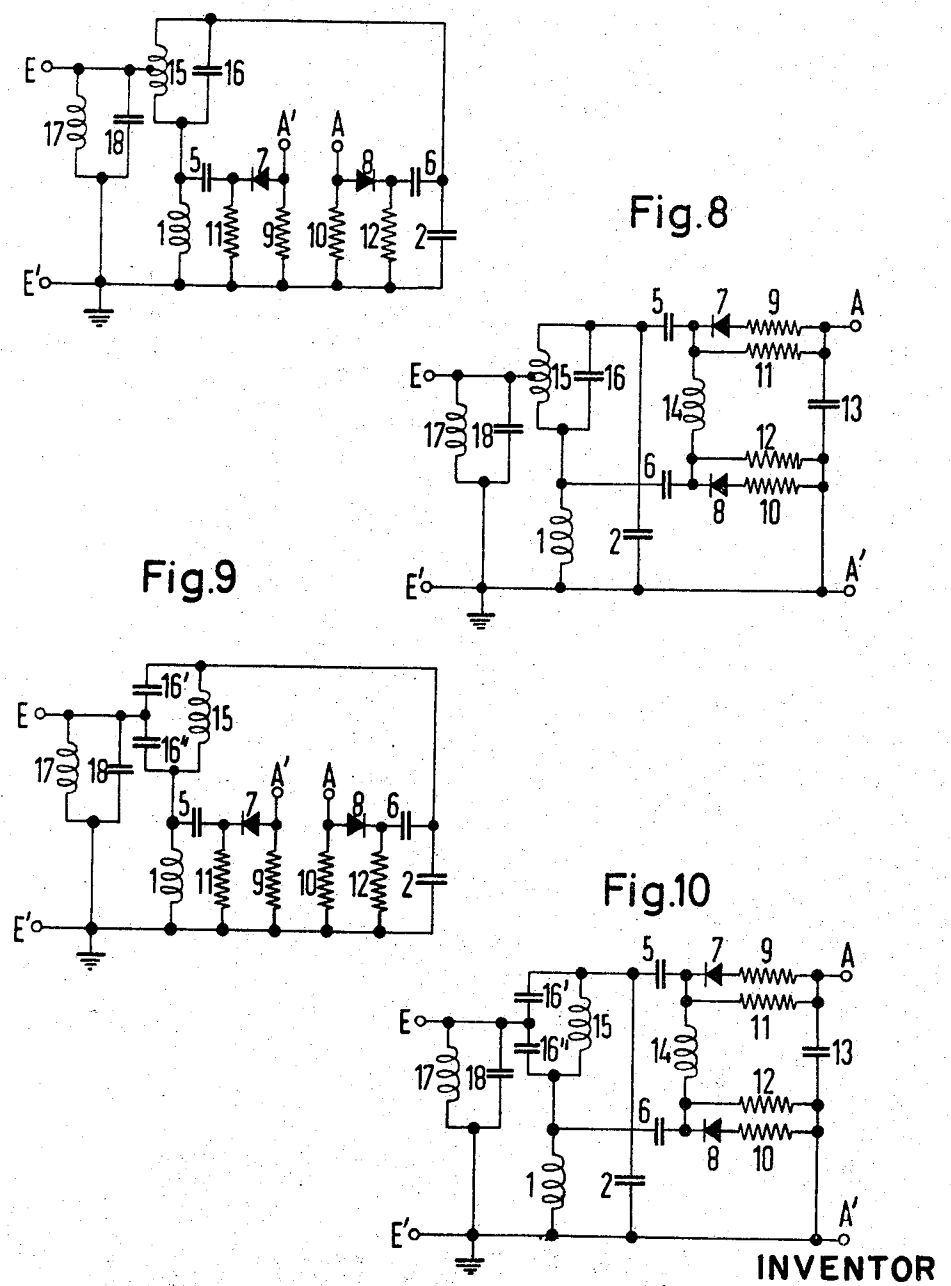

Instead of placing input terminal E on the middle tap of the oscillatory circuit coil 15, it may be placed on the electrical center of the oscillatory circuit capacitor 16. This can be achieved if the oscillatory circuit capacitor 16 is replaced by a series connection of two capacitors 16′, 16″, which in each case have twice the capacitance of the oscillatory circuit capacitor 16. FIGS. 5 and 6 illustrate circuits corresponding to FIGS. 3 and 4, in which the input terminal E is connected between the oscillatory circuit capacitors 16′ and 16″.

The circuits of FIGS. 7 to 10 correspond to the circuits 3 to 6 with the difference that between the input terminals E, E′, there is inserted a further parallel resonant circuit tuned to the central frequency, comprising the inductor 17 and the capacitor 18. If the signal frequency deviates from the central frequency, the angle between the voltages of the two oscillatory circuits then changes, in which process, however, the phase angle of 180° between the voltages of the oscillatory circuit 15, 16 with reference to the point E remains preserved. The angle between the voltages of the two oscillatory circuits is here approximately directly proportional to the frequency deviation.

The coupling of the two oscillatory circuits takes place over both the inductive reactor 1 and also the capacitive reactor 2, and as a consequence that the coupling loss, for example of capacitance 2, is approximately compensated by the coupling increase of the inductance 1.

The voltage drops over the reactors 1 and 2, as previously described, are rectified and so circuited with respect to one another that a differential voltage there results.

It will be apparent that many modifications and variations may be effected without departing from the scope of the novel concepts of this invention.

I claim:

1. A discriminator for obtaining an output voltage dependent upon a frequency change of an electrical oscillation, especially for the demodulation of frequency modulated electrical waves from a source having relatively low internal resistance as compared with the input resistance of the discriminator, comprising a bridge circuit, having two branches, connected in parallel, which forms the input for the oscillations, one of said branches containing a series circuit comprising an ohmic resistor and an inductive reactor, and the other of said branches containing a series circuit comprising an ohmic resistor and a capacitive reactor, said resistors forming the respective branch inputs and each having a resistance which is high as compared with the value of the corresponding reactor, said inductive and capacitive reactors being approximately equal in value at the central frequency, two rectifiers, one of which is disposed to rectify the voltage drop at the inductive reactor, and the other rectifier being disposed to rectify the voltage drop at the capacitive reactor, load resistances connected to the respective rectifiers at the output sides thereof, across which the respective rectified voltages appear, said load resistances being so interconnected that the rectified voltages form a differential voltage thereacross, the terminals of the load resistances across which said differential voltage appears forming the output terminals of the discriminator.

2. A discriminator for obtaining an output voltage dependent upon a frequency change of an electrical oscillation, especially for the demodulation of frequency modulated electrical waves, comprising a bridge circuit having two branches, connected in parallel, which forms the input for the oscillations, one of said branches containing a series circuit comprising an inductive reactor and a portion of a parallel resonant circuit, and the other of said branches containing a series circuit comprising a capacitive reactor and a portion of said parallel resonant circuit, the terminals of said resonant circuit are connected to the respective reactors, said inductive and capacitive reactors being approximately equal in value at the central frequency, said input to which the oscillations are supplied comprising the connecting point of said reactors and a tap disposed approximately at the electrical center of said parallel resonant circuit, two rectifiers, one of which is disposed to rectify the voltage drop at the inductive reactor, and the other rectifier being disposed to rectify the voltage drop at the capacitive reactor, load resistances connected to the respective rectifiers at the output sides thereof, across which the respective rectified voltages appear, said load resistances being so interconnected that the rectified voltages form a differential voltage thereacross, the terminals of the load resistances, across which said differential voltage appears, forming the output terminals of the discriminator.

3. A discriminator circuit according to claim 2, wherein said parallel resonant circuit comprises an inductance and a capacitor, said inductance having a tap, which with the connecting point of said reactances, comprises said input for the oscillations.

4. A discriminator circuit according to claim 2, wherein said parallel resonant circuit comprises an inductance and a pair of series connected capacitors, said input for the oscillations comprising the connecting point of said reactors and the connecting point of said series capacitors.

5. A discriminator circuit according to claim 2, comprising in further combination, a second parallel resonant circuit, tuned to the central frequency, which is connected in parallel with said input and thus coupled over said reactor, forming a band filter.

References Cited

UNITED STATES PATENTS

| | | | |
|---|---|---|---|
| 2,243,417 | 5/1941 | Crosby | 329—139 X |
| 2,782,302 | 2/1957 | Thom | 329—140 |
| 2,873,365 | 2/1959 | Janssen | 329—138 X |

| | | | |
|---|---|---|---|
| 2,969,468 | 1/1961 | Hogue | 307—88 |
| 3,217,263 | 11/1965 | Starreveld et al. | 325—349 |

ALFRED L. BRODY, *Primary Examiner.*

U.S. Cl. X.R.

307—295, 232; 325—349, 487; 328—155; 332—47